(12) United States Patent
Tomczyk

(10) Patent No.: US 10,373,040 B2
(45) Date of Patent: Aug. 6, 2019

(54) STORED VALUE CARD SYSTEMS WITH TAMPER EVIDENT ACTIVATION INDICIA

(71) Applicant: Travel Tags, Inc., North Mankato, MN (US)

(72) Inventor: John Tomczyk, Shoreview, MN (US)

(73) Assignee: Travel Tags, Inc., North Mankato, MN (US)

( * ) Notice: Subject to any disclaimer, the term of this patent is extended or adjusted under 35 U.S.C. 154(b) by 0 days.

(21) Appl. No.: 16/027,679

(22) Filed: Jul. 5, 2018

(65) Prior Publication Data

US 2019/0073577 A1 Mar. 7, 2019

Related U.S. Application Data

(60) Provisional application No. 62/528,704, filed on Jul. 5, 2017.

(51) Int. Cl.
| | | |
|---|---|---|
| *G06K 19/06* | (2006.01) | |
| *G06K 19/073* | (2006.01) | |
| *B42D 25/346* | (2014.01) | |
| *G06K 19/077* | (2006.01) | |
| *B42D 25/378* | (2014.01) | |

(52) U.S. Cl.
CPC ..... *G06K 19/07381* (2013.01); *B42D 25/346* (2014.10); *B42D 25/378* (2014.10); *G06K 19/06028* (2013.01); *G06K 19/07722* (2013.01)

(58) Field of Classification Search
CPC ....... G06K 19/06028; G06K 19/07381; G06K 19/07722
See application file for complete search history.

(56) References Cited

U.S. PATENT DOCUMENTS

| | | |
|---|---|---|
| 3,288,281 A | 11/1966 | Sparks |
| 3,773,251 A | 1/1973 | Hadick |
| 4,939,992 A | 7/1990 | Bird |
| 5,275,285 A | 1/1994 | Clegg |
| 5,419,433 A | 5/1995 | Harrer et al. |
| 5,489,123 A | 2/1996 | Roshkoff |
| 5,493,801 A | 2/1996 | James |
| 5,544,741 A | 8/1996 | Fantone et al. |
| 5,588,526 A | 12/1996 | Fantone et al. |
| 5,609,253 A | 3/1997 | Goade, Sr. |
| 5,650,209 A | 7/1997 | Ramsburg et al. |
| 5,660,925 A | 8/1997 | Cooley et al. |
| 5,760,381 A | 6/1998 | Stitch et al. |

(Continued)

OTHER PUBLICATIONS

SlingShot CD Package, 2 pages, c. 2000.

(Continued)

*Primary Examiner* — Seung H Lee
(74) *Attorney, Agent, or Firm* — Patterson Thuente Pedersen, P.A.

(57) ABSTRACT

Systems and methods for indicating tampering of a stored value card. The systems generally include a stored value card having a first activation indicia, and a removable label having a second activation indicia and covering the first activation indicia. To activate the stored value card, the first and second activation indicia are scanned. The removable label is configured to render the second activation indicia unreadable and/or to provide visual evidence of tampering such that activation is not recommended.

32 Claims, 11 Drawing Sheets

(56) References Cited

U.S. PATENT DOCUMENTS

| | | | |
|---|---|---|---|
| 5,782,347 | A | 7/1998 | Fantone et al. |
| 5,791,474 | A | 8/1998 | Hansen |
| 5,833,068 | A | 11/1998 | Fantone |
| 5,850,913 | A | 12/1998 | Fantone et al. |
| 5,851,630 | A | 12/1998 | Davis, II |
| 5,918,909 | A | 7/1999 | Fiala et al. |
| 5,941,382 | A | 8/1999 | Fantone et al. |
| 5,975,302 | A | 11/1999 | Young |
| 6,109,439 | A | 8/2000 | Goade |
| 6,178,426 | B1 | 1/2001 | Klein et al. |
| 6,179,119 | B1 | 1/2001 | Manoogian |
| 6,224,108 | B1 | 5/2001 | Klure |
| 6,245,382 | B1 | 6/2001 | Shvartsman et al. |
| 6,253,820 | B1 | 7/2001 | Landan et al. |
| 6,286,999 | B1 | 9/2001 | Cappel et al. |
| 6,315,206 | B1 | 11/2001 | Hansen et al. |
| 6,328,341 | B2 | 12/2001 | Klure |
| 6,349,928 | B1 | 2/2002 | Matheis et al. |
| 6,439,613 | B2 | 8/2002 | Klure |
| 6,454,165 | B1 | 9/2002 | Dawson |
| 6,481,994 | B1 | 11/2002 | McCannel et al. |
| 6,520,329 | B1 | 2/2003 | Fuchs |
| 6,543,809 | B1 | 4/2003 | Kistner et al. |
| 6,588,591 | B1 | 7/2003 | Schabert et al. |
| 6,588,658 | B1 | 7/2003 | Blank |
| 6,601,415 | B2 | 8/2003 | Takinami |
| 6,640,974 | B2 | 11/2003 | Malone |
| 6,715,795 | B2 | 4/2004 | Klure |
| 6,957,737 | B1 | 10/2005 | Frederickson et al. |
| 6,964,810 | B2 | 11/2005 | McCannel et al. |
| 7,117,512 | B1 | 10/2006 | Cahill |
| 7,219,829 | B2 | 5/2007 | Treat |
| 7,222,797 | B2 | 5/2007 | Davilla et al. |
| 7,300,535 | B2 | 11/2007 | McCannel et al. |
| 7,494,056 | B2 | 2/2009 | Sturm |
| 7,537,168 | B2 | 5/2009 | Anderson et al. |
| 7,607,574 | B2 | 10/2009 | Kingsborough et al. |
| 7,607,575 | B2 * | 10/2009 | Kingsborough ..... B42D 15/045 235/375 |
| 7,658,282 | B2 | 2/2010 | Costel |
| 7,681,732 | B2 | 3/2010 | Moehlenbrock et al. |
| 7,726,477 | B1 | 6/2010 | Gaither |
| 8,181,789 | B1 | 5/2012 | Casella et al. |
| 8,292,072 | B2 | 10/2012 | Corey et al. |
| 8,419,889 | B2 | 4/2013 | Smith |
| 8,523,078 | B2 * | 9/2013 | Biskupski ............ B42D 15/025 235/375 |
| 8,720,786 | B2 * | 5/2014 | Boge ................... G06K 19/083 235/375 |
| 8,833,553 | B2 | 9/2014 | Corey et al. |
| 8,944,470 | B2 | 2/2015 | Mayrhofer et al. |
| 2002/0088855 | A1 | 7/2002 | Hodes |
| 2002/0157973 | A1 | 10/2002 | Preisler |
| 2003/0004889 | A1 | 1/2003 | Fiala et al. |
| 2003/0018586 | A1 | 1/2003 | Krahn |
| 2003/0028439 | A1 | 2/2003 | Cox |
| 2003/0080013 | A1 | 5/2003 | Smith |
| 2003/0150762 | A1 | 8/2003 | Biller |
| 2003/0234191 | A1 | 12/2003 | Belden, Jr. et al. |
| 2004/0008613 | A1 | 1/2004 | Beckwith et al. |
| 2004/0139318 | A1 * | 7/2004 | Fiala ................. G06Q 20/3558 713/165 |
| 2004/0151880 | A1 | 8/2004 | Nakamura et al. |
| 2005/0045503 | A1 | 3/2005 | Wong et al. |
| 2005/0045732 | A1 | 3/2005 | Whitaker |
| 2005/0199516 | A1 | 9/2005 | Laarman |
| 2005/0205442 | A1 | 9/2005 | Spagna |
| 2005/0279143 | A1 | 12/2005 | Belden, Jr. et al. |
| 2005/0279825 | A1 | 12/2005 | Ashby et al. |
| 2006/0207896 | A1 | 9/2006 | Shiga |
| 2006/0246984 | A1 | 11/2006 | Walker et al. |
| 2006/0256413 | A1 | 11/2006 | Kitamura |
| 2007/0144044 | A1 | 6/2007 | Kershner et al. |
| 2007/0278114 | A1 | 12/2007 | Kane et al. |
| 2008/0030864 | A1 | 2/2008 | Gougeon et al. |
| 2008/0088126 | A1 | 4/2008 | Hoffman |
| 2008/0088931 | A1 | 4/2008 | Hoffman |
| 2008/0116089 | A1 | 5/2008 | Roberts |
| 2008/0150174 | A1 | 6/2008 | Raymond et al. |
| 2008/0213528 | A1 | 9/2008 | Hoffman |
| 2008/0237317 | A1 | 10/2008 | Rosendall |
| 2009/0078590 | A1 | 3/2009 | Smith |
| 2009/0091123 | A1 | 4/2009 | Conley et al. |
| 2009/0107862 | A1 | 4/2009 | Pascua et al. |
| 2009/0277808 | A1 | 11/2009 | Payne |
| 2010/0193583 | A1 | 8/2010 | Tartavull et al. |
| 2010/0213092 | A1 | 8/2010 | Swain |
| 2010/0224516 | A1 | 9/2010 | Abell |
| 2011/0031148 | A1 | 2/2011 | Rosendall et al. |
| 2011/0132783 | A1 | 6/2011 | Williams et al. |
| 2011/0203722 | A1 | 8/2011 | Smith |
| 2012/0145578 | A1 | 6/2012 | Pazlar et al. |
| 2012/0256006 | A1 | 10/2012 | Schmitt |
| 2012/0273576 | A1 | 11/2012 | Tomczyk et al. |
| 2013/0068642 | A1 | 3/2013 | Corey et al. |
| 2013/0248406 | A1 | 9/2013 | Glinert |
| 2013/0294602 | A1 | 11/2013 | Huxham et al. |
| 2014/0076978 | A1 * | 3/2014 | Smith ................. G06Q 20/354 235/492 |
| 2014/0116908 | A1 | 5/2014 | Beyer et al. |
| 2016/0005031 | A1 | 1/2016 | O-Regan et al. |
| 2016/0031624 | A1 | 2/2016 | Pascua et al. |
| 2016/0332789 | A1 | 11/2016 | Yerecic |
| 2017/0243098 | A1 | 8/2017 | Pascua et al. |
| 2017/0323191 | A1 | 11/2017 | Pascua et al. |
| 2018/0079248 | A1 | 3/2018 | Pascua et al. |

OTHER PUBLICATIONS

Introducing RiverBorne™ Communications, 17 pages, c. 2000.

Printout of various lenticular packaging options, 3 pages, at least as of Nov. 13, 2009.

Application and File history for U.S. Appl. No. 15/439,743, filed Feb. 22, 2017. Inventors: Pascua et al.

Application and File history for U.S. Appl. No. 15/711,766, filed Sep. 21, 2017. Inventors: Pascua et al.

Application and File history for U.S. Appl. No. 15/585,953, filed May 3, 2017. Inventors: Pascua et al.

Application and File history for U.S. Appl. No. 14/813,940, filed Jul. 30, 2015. Inventors: Pascua et al.

* cited by examiner

STORED VALUE CARD SYSTEMS WITH TAMPER EVIDENT ACTIVATION INDICIA

RELATED APPLICATION

The present application claims the benefit of U.S. Provisional Application No. 62/528,704 filed Jul. 5, 2017, which is hereby incorporated herein in its entirety by reference.

TECHNICAL FIELD

This application relates generally to stored value cards, and more particularly relates to activation indicia systems to indicate any tampering with the cards done for fraudulent purposes.

BACKGROUND

Stored value cards, which may also be known as gift cards, debit cards, loyalty or reward cards, identification cards, prepaid cards, refund or return cards, shopping cards or fare cards, prepaid MasterCard™ and Visa™ cards (instant issue) among other names, are very popular with both consumers and retailers. The wide appeal of stored value cards, as a result, has attracted the unwelcome attention of criminals seeking to exploit the conveniences and automated processes afforded by such cards. In particular, such criminals misappropriate and manipulate stored value cards and associated account information to perform fraudulent transactions. Stored value card fraud is typically perpetrated in the form of either at the physical point of sale (POS) or "card present" fraud, or for virtual POS purchases or "card not present" (CNP) fraud. The latter includes transactions, such as in e-commerce or internet purchases, which cannot be authenticated using "standard" processes used at the physical POS.

A stored value card is typically the size and shape of a conventional credit card (CR80 Card), but it may be other shapes and sizes as well, and includes a magnetic stripe, bar code, alpha/numeric, or other similar activation method, account identifying element, or means for using the card. The stripe, code, account identifying element, etc. on the card is encoded with data, which includes a unique account number. The account identifying element, for example, may be visible while the card is secured in or secured to packaging, such that the account identifying element may be used during the purchase and activation of the card.

Commonly, stored value cards are displayed by retailers for purchase by customers. Another use of stored value cards is as refund or return cards used to give customers value or store credit when they are returning merchandise without a receipt, after expiration of the return date, or for other reasons. In these circumstances, instead of giving the customer cash, the customer gets a debit card or stored value card with the corresponding value of the return loaded onto the card.

The cards are stored in an active or inactive state. In the inactive state, the card cannot be used to purchase goods or services until the card has been activated. For example, one or more cards may be contained in a carrier, in which the card(s) and/or carrier includes an activation code associated with the card(s). The carrier and/or packaging or other security elements obscures other card information, such as the card identification number, account identification number, and/or PIN until the carrier is opened and the card is removed.

A customer may have a card activated by bringing a card to a cashier and having the cashier then, for example, swipe the card through a point of sale terminal, which may add value to the card in exchange for payment, or activate value already on the card. In this context, the "swipe" action could involve passing a card (or its packaging) though a magnetic strip reader/writer; or passing the card or package over a barcode scanner; or putting the card or package in the vicinity of a proximity reader/writer (such as, for example, an RFID reader/writer or NFC reader), or any other equivalent activation technique. A balance on the card may be maintained within a computer system located at the point of sale or at a remote location. A holder of the stored value card may then use the card to purchase goods and/or services immediately or over time up to the value of the card. These current procedures relating to stored value cards, although providing convenience to consumers, leave the cards vulnerable to criminals. If the card is stored in an active state, the card does not need to be activated, and is ready for use upon extracting the card from the package. If the card is stored in the active state, however, the card, data, and value on the account may be even more vulnerable.

One particular fraud that is perpetuated by criminals with regard to stored value cards is called "skimming." Skimming is a serious problem resulting in significant loss to both retailers and consumers, and applies to both card present and CNP fraud. To skim a card having a magnetic stripe holding account information, for example, a criminal will purchase or otherwise obtain a stored value card from a retailer, thereby causing an account associated with the card to become activated. The criminal will then remove additional cards from the store that have not yet been activated, and will then alter magnetically stored information on the inactivated cards to match that of the activated card. As such, all of the altered, inactivated cards will have the magnetic information that identifies the account of the originally purchased card. The criminal will then return the altered cards to the store shelf where unsuspecting customers seeking to purchase a stored value card will unknowingly place money into the account of the criminal holding the originally purchased card. The unsuspecting customer may attempt to use their card and will be told that it has no associated value or has a smaller value than thought.

Alternatively, a criminal will remove at least two cards from the location or store of a retailer unbeknownst to the retailer. The magnetically stored information of the first card is altered to match the magnetically stored information of the second card. The first card is returned to the store, again unbeknownst to the retailer. When the first card is subsequently purchased and activated, it also activates the second card which is in the possession of the criminal.

This fraud may also be perpetrated by swapping activation indicia, such as a barcode. For example, the criminal removes two cards from the location or store of a retailer. The activation indicia of the second card is copied and placed on the first card. The first card is then returned to the store. When the first card is subsequently purchased and activated, it also activates the second card which is in the possession of the criminal.

In either case, the retailer may be able to verify that the customer did not use the value associated with the stored value card, and in the interest of customer service, may restore the value to the customer. In that case, the retailer loses the money. However, in some cases, there may be no way to prove fraud and the customer may lose up to the entire value.

Another fraud perpetuated by criminals is carried out by the criminal viewing stored value cards in the store. The criminal writes down the code associated with the particular stored value card (such as a credit card type number) while it is still in the store. In such situations the code is in plain view of the criminal or may be easily viewed without altering the card packaging. Once the criminal has recorded the code, the criminal waits for a period of time, assuming that an unsuspecting customer will purchase and have the card activated during that time. The criminal then periodically checks to see if they are able to make purchases, such as online purchases (CNP fraud), by attempting to use the card code. If the card has been activated by the true purchaser, the criminal will be able to purchase goods online using the activated code, thereby stealing the balance on the card from the true purchaser.

Criminals may perpetuate the above-described frauds or other frauds with regard to stored value cards as they sit on store shelves today. Thus, there is a need for a way to protect such cards and insure that they have not been tampered with or duplicated prior to purchase or activation by an innocent consumer.

There have been proposals and attempts to reduce the occurrence of fraud associated with stored value cards. For example, modifications to card readers or other parts of the activation process have been proposed, but changing existing systems and/or activation methods in such ways involves significant cost and inconvenience to the retailer. Additional steps have been added to the activation process for some cards, such as steps involving pin numbers and web access. However, additional steps reduce the level of convenience that such cards provide to consumers. Overall, there is a need for a way to prevent fraud relating to stored value cards that is effective, and inexpensive to implement, while at the same time not negating the convenience of stored value cards.

SUMMARY OF THE DISCLOSURE

In one embodiment, a stored value card with two-step tamper evident activation system generally includes an inactive stored value card having first activation indicia, such as a barcode, account number, and/or serial number thereon, and a removable label at least partially covering the activation indicia. A second activation indicia, and optional serial number, is printed or otherwise applied on a reverse side of the label, such that when the label is adhered to the card or card carrier (i.e. packaging), the second activation indicia is not visible. The label includes cut scores or perforations forming a pull tab portion including a pull tab, such that when the pull tab is pulled back, the label breaks at the cut scores or perforations such that only the pull tab portion of the label is removed, revealing the first activation indicia on the card, and the second activation indicia on the reverse side of the label. To activate the card, both the first and second activation indicia are read, such as by scanning or manually keying in the alphanumeric PIN associated with the barcode. The reverse side of the label also includes tamper evident text on a periphery of the label such that in the event the entire label is removed or attempted to be removed, the tamper evident text remains on the card, indicating that the card may be compromised, and activation is not recommended.

In a similar embodiment, the removable label includes patterned cut scores or perforations around the periphery such that in the event the entire label is removed or attempted to be removed, the patterned cut scores or perforations are irreversibly broken or burst, visually indicating that the card may be compromised, and activation is not recommended.

In another embodiment, a stored value card with a two-step tear-away activation system generally includes an inactive stored value card, an optional base label permanently adhered to the card, a first activation indicia, such as a barcode, account number, and/or serial number, printed or otherwise applied to the base label, a removable label adhered over the first activation indicia, and a second activation indicia printed or otherwise applied on the removable label. The removable label includes perforations or cut scores defining a releaseable pull tab portion. The second activation indicia is applied to the removable label such that the activation indicia extends over both the pull tab portion and one or more periphery portions. To activate the card, the second activation indicia is scanned or otherwise read, as described above. The pull tab portion is removed, which destroys the second activation indicia, and reveals the entirety of the first activation indicia, which is then scanned to complete proper two-step activation of the card. In the event the base label is removed, there is no access to the card activation data or means for activation. The base label may also optionally be opaque and/or include tamper slits to further visually indicate tampering and a possible compromised card.

In one embodiment, the base label and top removable label are imaged and then assembled. In another embodiment, the base label is premade with the first activation indicia, and the top removable label is pre-applied over the base label. The top removable label is then imaged with the second activation indicia.

In another similar embodiment, the system does not include a base label. Instead, the first activation indicia is printed or otherwise applied directly on the card. Upon removable of the removable label the second activation indicia is destroyed, as in the previous embodiment.

In another embodiment, a stored value card with an overlapping two-step activation system generally includes an inactive stored value card, a base label permanently or destructively adhered to the card, a first activation indicia, such as a barcode, account number, and/or serial number, printed or otherwise applied to the base label in which a portion of the first activation indicia extends past the label and onto the card, a removable label removably adhered over the first activation indicia, and a second activation indicia printed or otherwise applied to the removable label in which a portion of the second activation indicia also extends past the removable label and onto the card. To activate the card, the second activation indicia is scanned or otherwise read as described above. After scanning, the removable label is removed to reveal the first activation indicia, and leaving the overlapping portion of the second activation indicia on the card such that the second activation indicia is now unreadable. The first activation indicia is then scanned or otherwise read to complete proper activation. In the event the base label is removed, the overlapping portion of the first activation indicia remains on the card such that the first activation indicia is unreadable. In this embodiment, because the first and second activation indicia extend onto the card, reapplication of the label is difficult to properly realign the activation indicia. Furthermore, if the base label is removed, there is no access to the card data or means for activation.

In another embodiment, a tamper evident system generally includes an inactive stored value card having a first activation indicia, such as a barcode, printed or otherwise applied there on. A destructible label is adhered over the activation indicia. Upon removal of the label, the label distorts or self-destructs such that if reapplied, tampering is evident or card scanner cannot read the activation indicia.

In another embodiment, a stored value card with a two-step, tamper evident activation system generally includes an inactive stored value card having an opaque base label permanently adhered to the card, a first activation indicia, such as a barcode, account number, and/or serial number, printed or otherwise applied to the base label, and a removable pull tab label applied over and at least partially covering the first activation indicia. A second activation indicia and optional serial number are printed or otherwise applied on a reverse side of the label such that when the label is adhered to the card, the second activation indicia is not visible. The label includes cut scores or perforations forming a pull tab portion including a pull tab, such that when the pull tab is pulled back, the label breaks at the cut scores or perforations and only the pull tab portion of the label is removed, revealing the first activation indicia on the card, and the second activation indicia on the reverse side of the label. To activate the card, both the first and second activation indicia are read as described above. The removable label includes patterned cut scores or perforations around the periphery such that in the event the entire label is removed or attempted to be removed, the patterned cut scores or perforations are irreversibly broken or burst, indicating that the card may be compromised, and activation is not recommended. In addition or alternatively, tamper evident text may be included on the periphery of the removable label such that if the removable label is removed, the tamper evident text remains on the card to indicate tampering. In the event the base label is entirely removed, there is no access to the card data or means for activation.

In a similar embodiment, the second activation indicia is printed on the top side of the removable label such that a portion of the second activation indicia extends onto the base label and/or card. To activate the card, the second activation indicia is scanned as described above. The pull tab portion of the removable label is pulled back to expose the first activation indicia, while rendering the second activation indicia unreadable. The first activation indicia is then scanned or read as described above to complete activation. Removal of the removable label prior to activation makes replacement of the removable label difficult to align with the base label. Furthermore, in the event the base label is entirely removed, there is no access to the card data or means for activation.

In yet another embodiment, a stored value card with two-step activation system generally includes an inactive stored value card, a first activation indicia, such as a barcode, account number, and/or serial number, printed or otherwise applied to the card and/or on an opaque label permanently adhered to the card, and a removable pull tab label applied over and at least partially covering the first activation indicia. A second activation indicia and optional serial number formed of an invisible fluorescent material or ink are printed or otherwise applied on the removable label or reverse side of the removable label. To activate, the second activation indicia is scanned or otherwise read as described above. The pull tab portion of the removable label is pulled open to expose the first activation indicia which is then scanned or otherwise read to complete activation. The invisible fluorescent second activation is difficult to copy or reproduce, as it may not be apparent to a thief that it exists. Furthermore, the pull tab removable label indicates evidence of tampering if attempted to be removed to expose the first activation indicia.

In any of the embodiments described herein, the base label and/or removable label are optionally designed such that if copied (e.g. copier machine), the activation indicia would not show.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

Figure 1A:
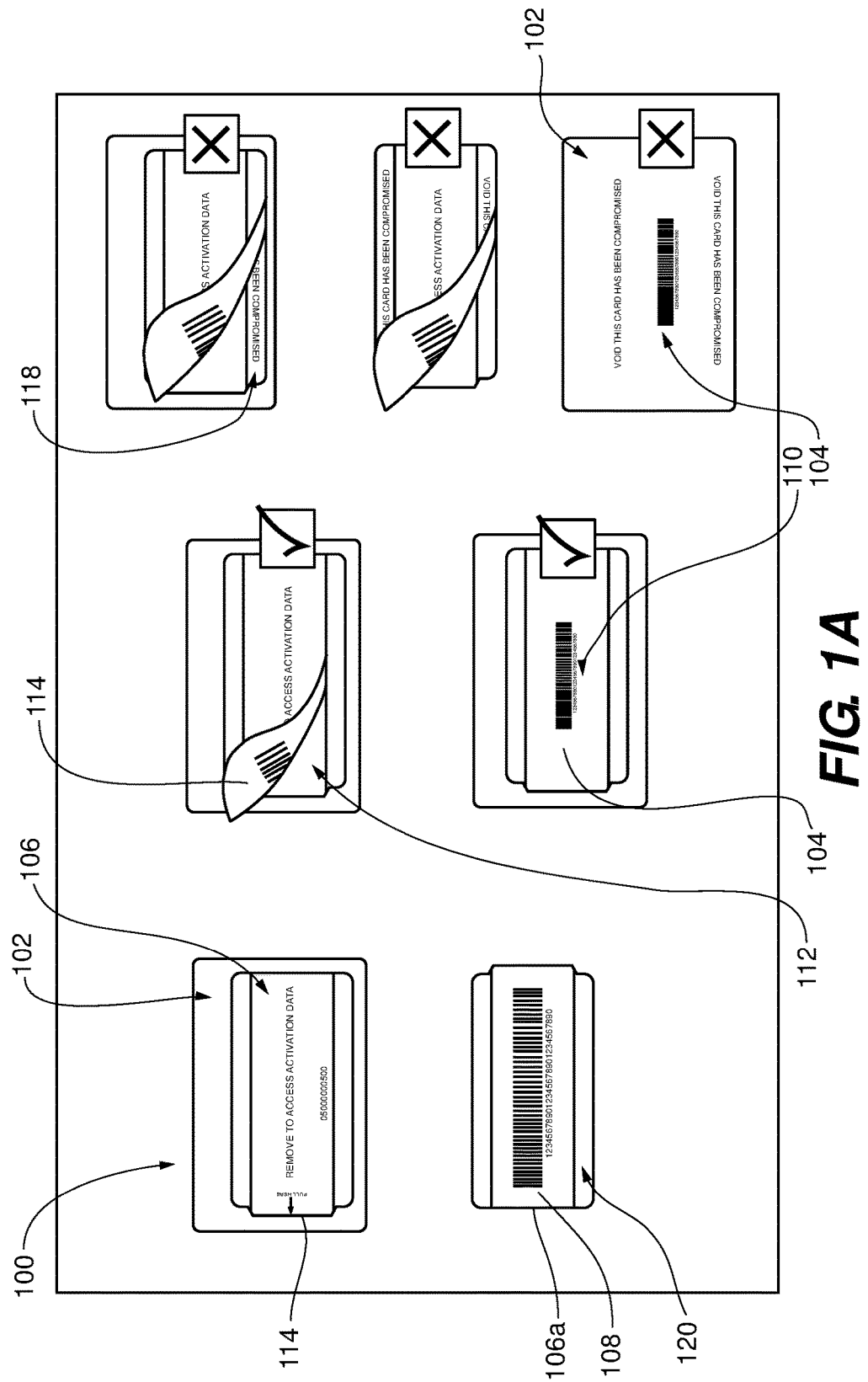
FIG. 1A depicts a stored-value card with two step activation system including a removable pull tab label with tamper evident text according to an embodiment.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

The embodiments described below are not intended to be exhaustive or to limit the invention to the precise forms disclosed in the following detailed description. Rather the embodiments are chosen and described so that others skilled in the art may appreciate and understand the entire disclosure.

Referring to FIG. 1A, a stored-value card with two step activation system 100 generally includes an inactive stored value card 102 having first activation indicia 104, such as a barcode, account number, and/or serial number, thereon, and a removable label 106 at least partially covering the first activation indicia 104 and with an optional serial number 110 and/or other text and graphics printed thereon. A second activation indicia 108 is printed or otherwise applied on a reverse side 106a of the label 106, such that when the label 106 is adhered to the card 102, the second activation indicia 108 is not visible. The label 106 includes cut scores or perforations 112 forming a pull tab portion 114 including a pull tab 116, such that when the pull tab 116 is pulled back, the label 106 breaks at the cut scores or perforations 112 such that only the pull tab portion 114 of the label is removed, revealing the first activation indicia 104 on the card 102, and the second activation indicia 108 on the reverse side 106a of the label 106. The removable label 106 can be adhered to card 102 by a dry release adhesive in the pull tab portion, while a permanent adhesive such as a pressure sensitive adhesive can be used to adhere periphery portions 120 to card 102.

To activate the card 102, both the first and second activation indicia 104, 108 are read, such as by scanning or manually keying in the alphanumeric PIN associated with the barcode. The reverse side 106a of the label 106 also includes tamper evident text 118 on a periphery 120 of the label such that in the event the entire label 106 is removed or attempted to be removed, the tamper evident text 118 remains on the card 102, indicating that the card 102 may be compromised, and activation is not recommended.

Figure 1B:
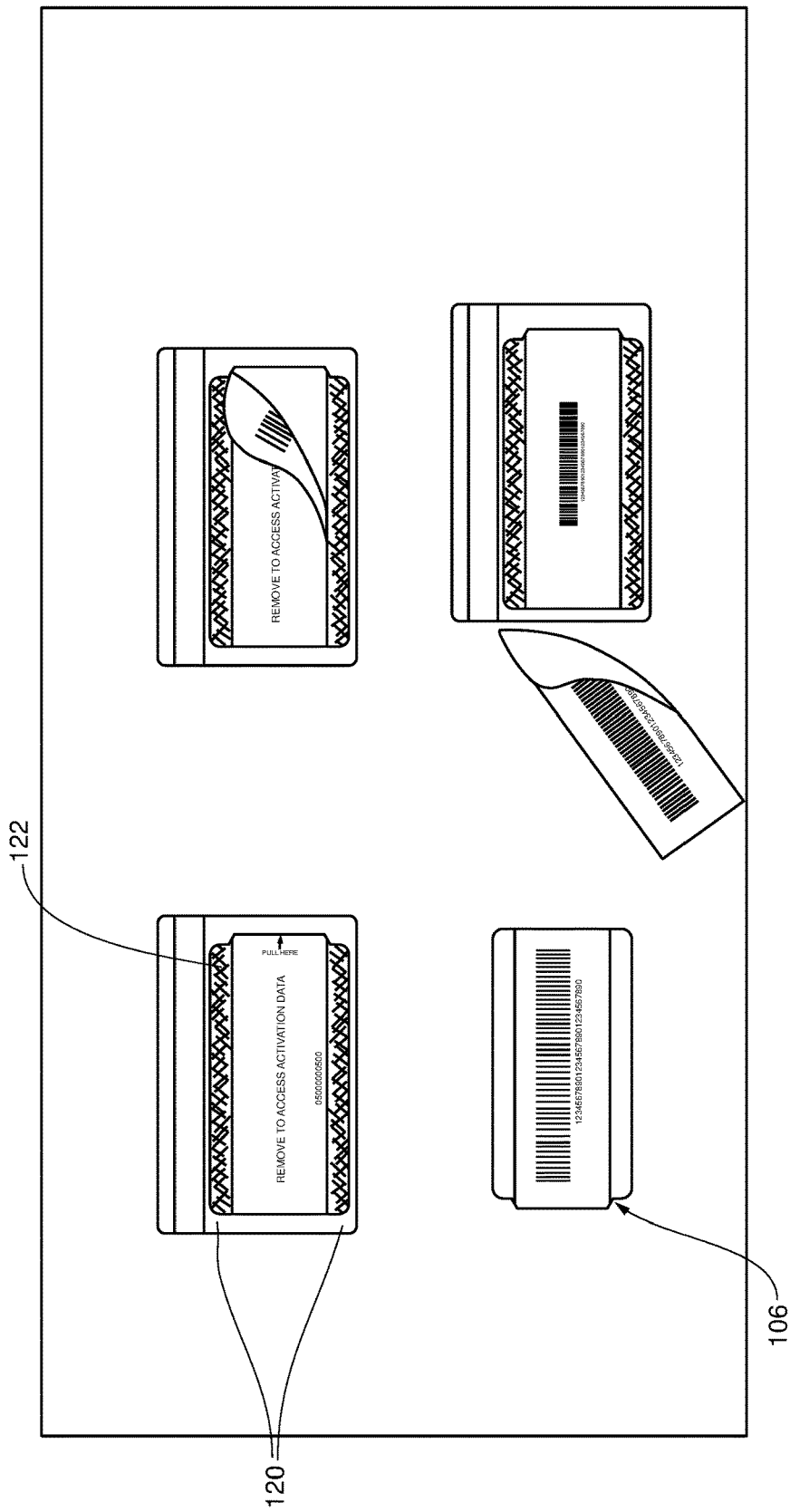
FIG. 1B depicts a stored-value card with two step activation system including a removable pull tab label and tamper evident perforations or cut scores according to another embodiment.

Referring now to FIG. 1B, tamper evident text 118 of FIG. 1A, is replaced with tamper evident cut score or perforated patterns 122 along the periphery portions 120. If the entire label 106 is removed or attempted to be removed, the patterns 122 are irreversibly broken or burst, indicating that the card may be compromised, and activation is not recommended.

Figure 1C:
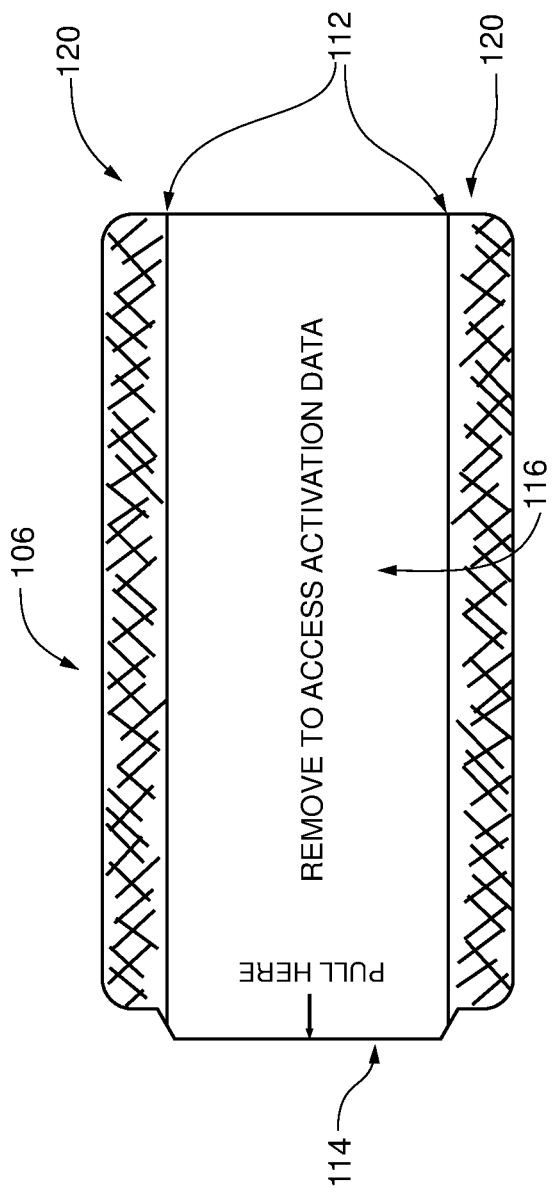
FIG. 1C depicts a pull tab removable label according to an embodiment.

Referring now to FIG. 1C, label 106 generally includes cut scores or perforations 112 defining a pull tab portion 114 including a pull tab 116, and one or more periphery regions 120. Pull tab portion 114 can include text, graphics, or other indicia instructing a user to remove the portion 114 by pulling to access activation indicia for the card 102. Periphery regions 122 can include tamper evident text 118 and/or patterns 122 described above. Periphery regions 122 can also be a darker color than pull tab portion 114. Perforations 112 can optionally include text and/or graphics on an external facing side that span the perforations 112 so that when the pull tab portion 114 is pulled, the text and/or graphics are disrupted to indicate tampering.

Figure 2:
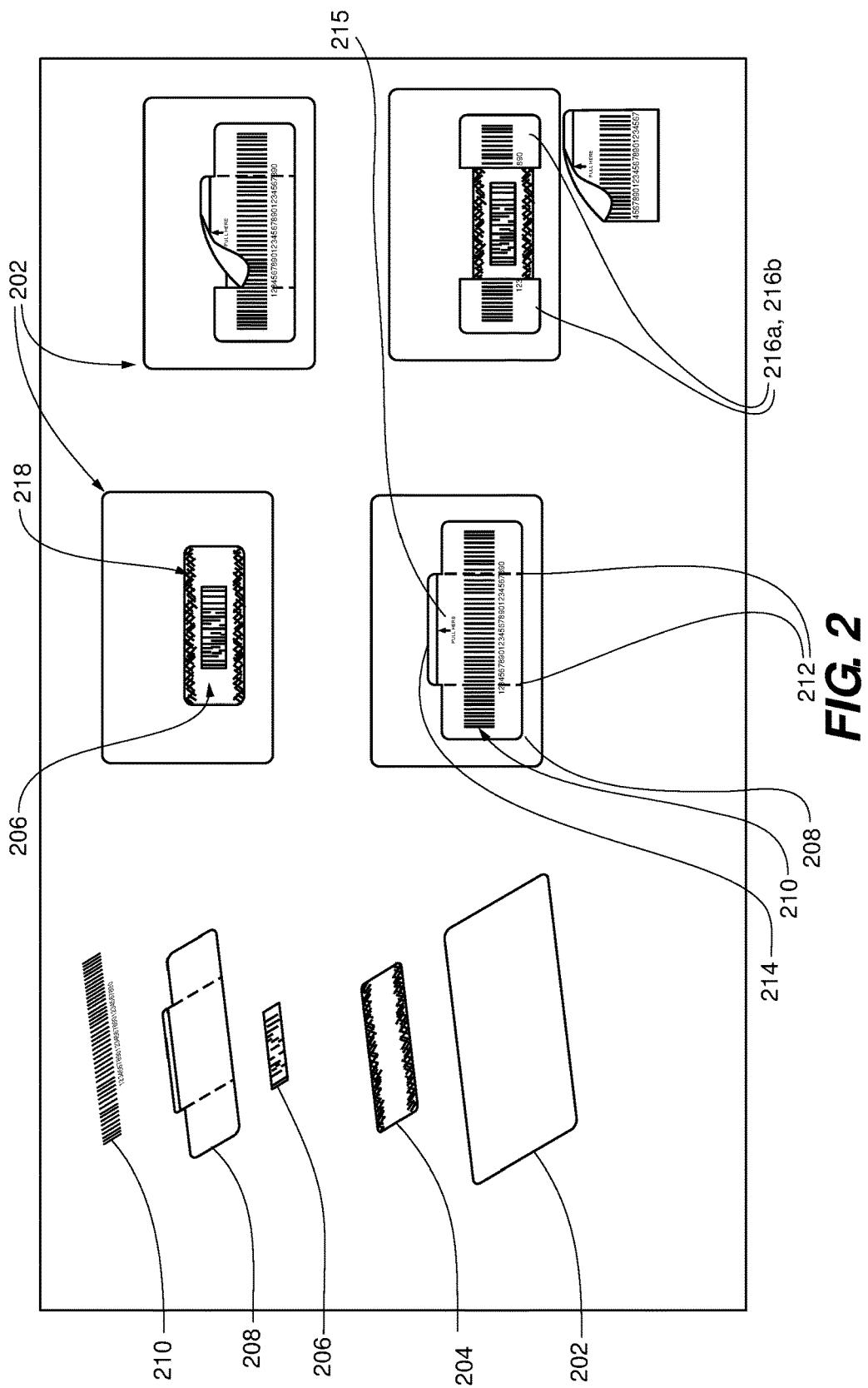
FIG. 2 depicts a stored-value card with two step activation system including a tear away removable label and permanently adhered label according to an embodiment.

Referring now to FIG. 2, in another embodiment, a stored value card with a two-step tear-away activation system 200 generally includes an inactive or active stored value card 202, an optional base label 204 permanently or destructively adhered to the card 202, a first activation indicia 206, such as a barcode, account number, and/or serial number, printed or otherwise applied to the base label 204, a removable pull tab label 208 removably adhered over the first activation indicia 206, and a second activation indicia 210 printed or otherwise applied to the removable label 208. The removable label 208 includes perforations or cut scores 212 defining a releaseable pull tab portion 214 with pull tab 215.

The second activation indicia 210 is applied to the removable label 208 such that the activation indicia 210 extends over both the pull tab portion 214 and one or more periphery portions 216a,b. The removable label 208 can be adhered to card 202 by a dry release adhesive in pull tab portion 214, while a permanent adhesive, such as a pressure sensitive adhesive, is used in periphery regions 216a,b.

To activate the card 202, the second activation indicia 210 is scanned or otherwise read, as described above. The pull tab portion 214 is removed, which destroys the second activation indicia 210, and reveals the entirety of the first activation indicia 206, which is then scanned to complete proper activation of the card 202. In the event the base label 204 is removed, there is no access to the card data or means for activation. The base label 204 may also optionally include tamper slits or patterns 218 to further indicate tampering and a possible compromised card. In some embodiments, the base label 204 is optionally removable to expose additional card data underneath.

Figure 3:
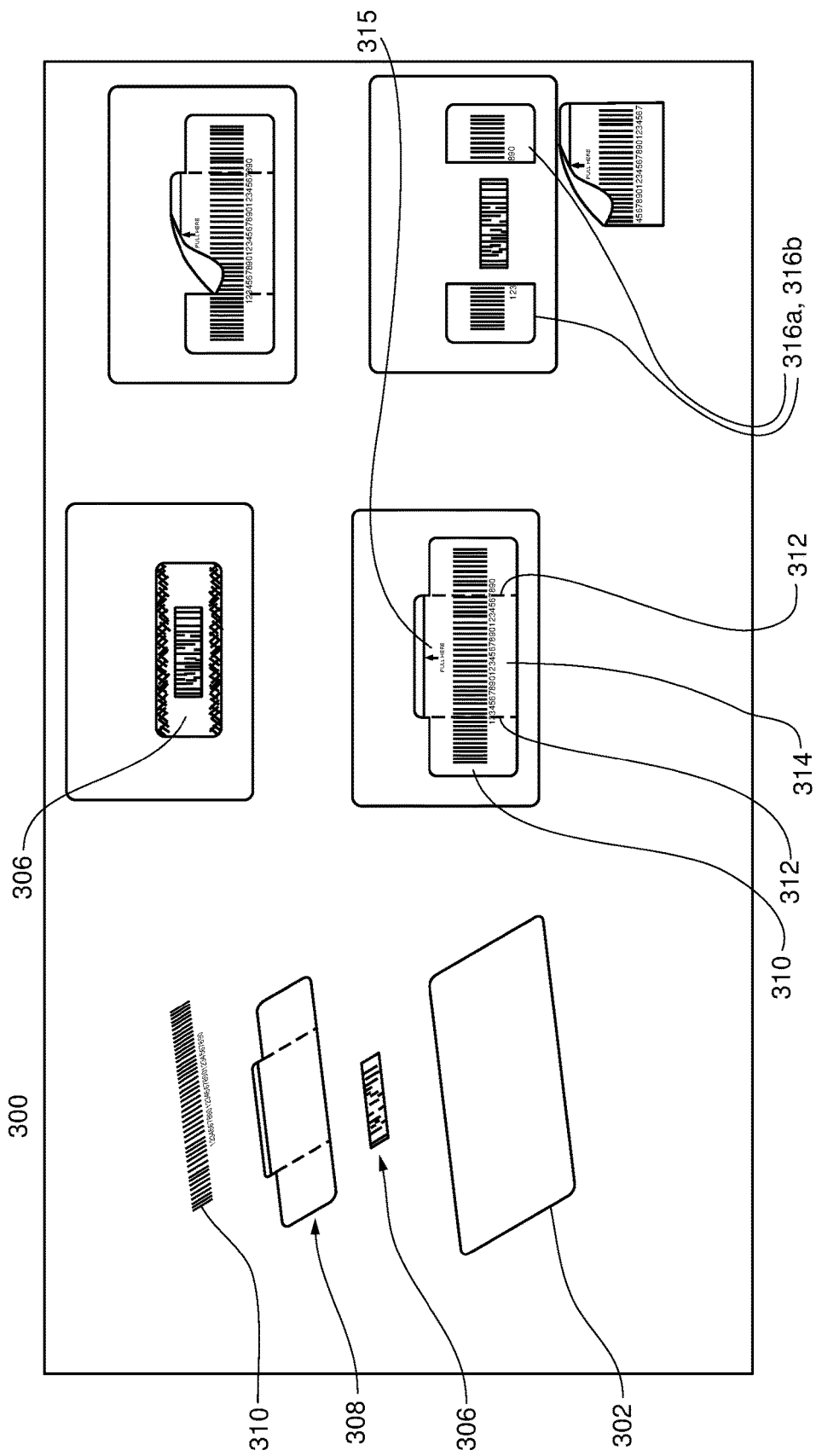
FIG. 3 depicts a stored-value card with two step activation system including a tear away removable label according to an embodiment.

Referring to FIG. 3, in an embodiment similar to the embodiment depicted in FIG. 2, the system 300 does not include a base label. Instead, a stored value card with a two-step, a tear-away activation system 300 generally includes an inactive or active stored value card 302, a first activation indicia 306, such as a barcode, account number, and/or serial number, printed or otherwise applied to card 302, a removable pull tab label 308 removably adhered over the first activation indicia 306, and a second activation indicia 310 printed or otherwise applied to the removable label 308. The removable label 308 includes perforations or cut scores 312 defining a releaseable pull tab portion 314 with pull tab 315. The second activation indicia 310 is applied to the removable label 308 such that the activation indicia 310 extends over both the pull tab portion 314 and one or more periphery portions 316a,b. The removable label 308 can be adhered to card 302 by a dry release adhesive in pull tab portion 314, while a permanent adhesive, such as a pressure sensitive adhesive, is used in periphery regions 316a,b. To activate the card, the similar steps are taking as set forth above with respect to FIG. 2

Figure 4:
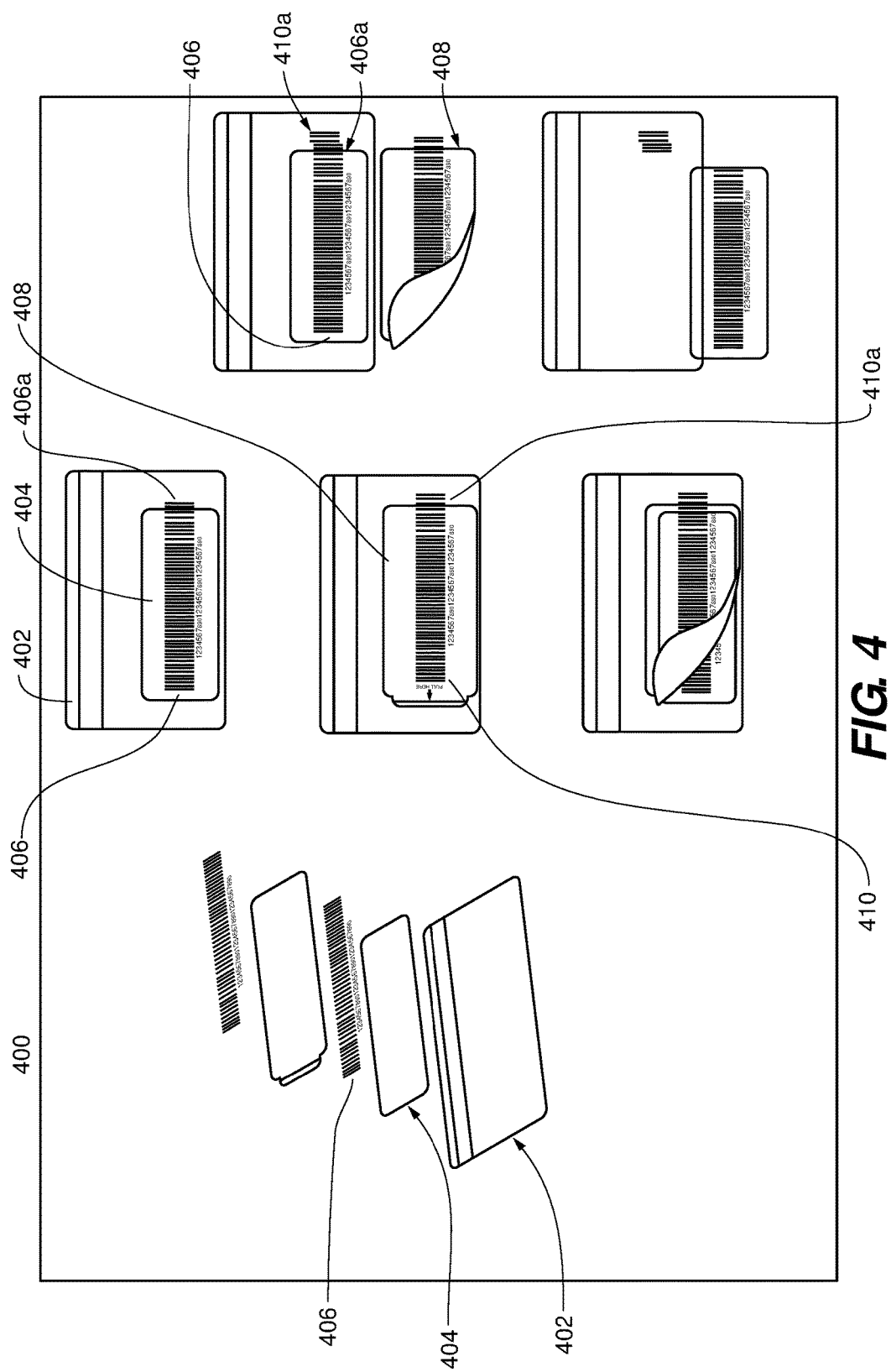
FIG. 4 depicts a stored-value card with two step activation system including an overlapping barcode configuration according to an embodiment.

Referring to FIG. 4, a stored value card with an overlapping two-step activation system 400 generally includes an inactive or active stored value card 402, a base label 404 permanently or destructively adhered to the card, a first activation indicia 406, such as a barcode, account number, and/or serial number, printed or otherwise applied to the base label 404 in which a portion 406a of the first activation indicia 406 extends past the label 404 and onto the card 402, a removable label 408 removably adhered over the first activation indicia 406, and a second activation indicia 410 printed or otherwise applied to the removable label 408 in which a portion 410a of the second activation indicia 410 also extends past the removable label 408 and onto the card 402.

To activate the card 402, the second activation indicia 410 is scanned or otherwise read as described above. After scanning, the removable label 408 is removed to reveal the first activation indicia 406, and leaving the overlapping portion 410a of the second activation indicia 410 on the card 402 such that the second activation indicia 410 is now unreadable. The first activation indicia 406 is then scanned or otherwise read to complete proper activation. In the event the base label 404 is removed, the overlapping portion 406a of the first activation indicia 406 remains on the card 402 such that the first activation indicia 406 is unreadable. In this embodiment, because the first and second activation indicia 406, 410 extend onto the card, reapplication of the labels

404, 408 is difficult to properly realign the activation indicia 406, 410. Furthermore, if the base label 404 is removed, there is no access to the card data or means for activation, even if label 404 is separated as data is missing and remains on card 402.

Figure 5:
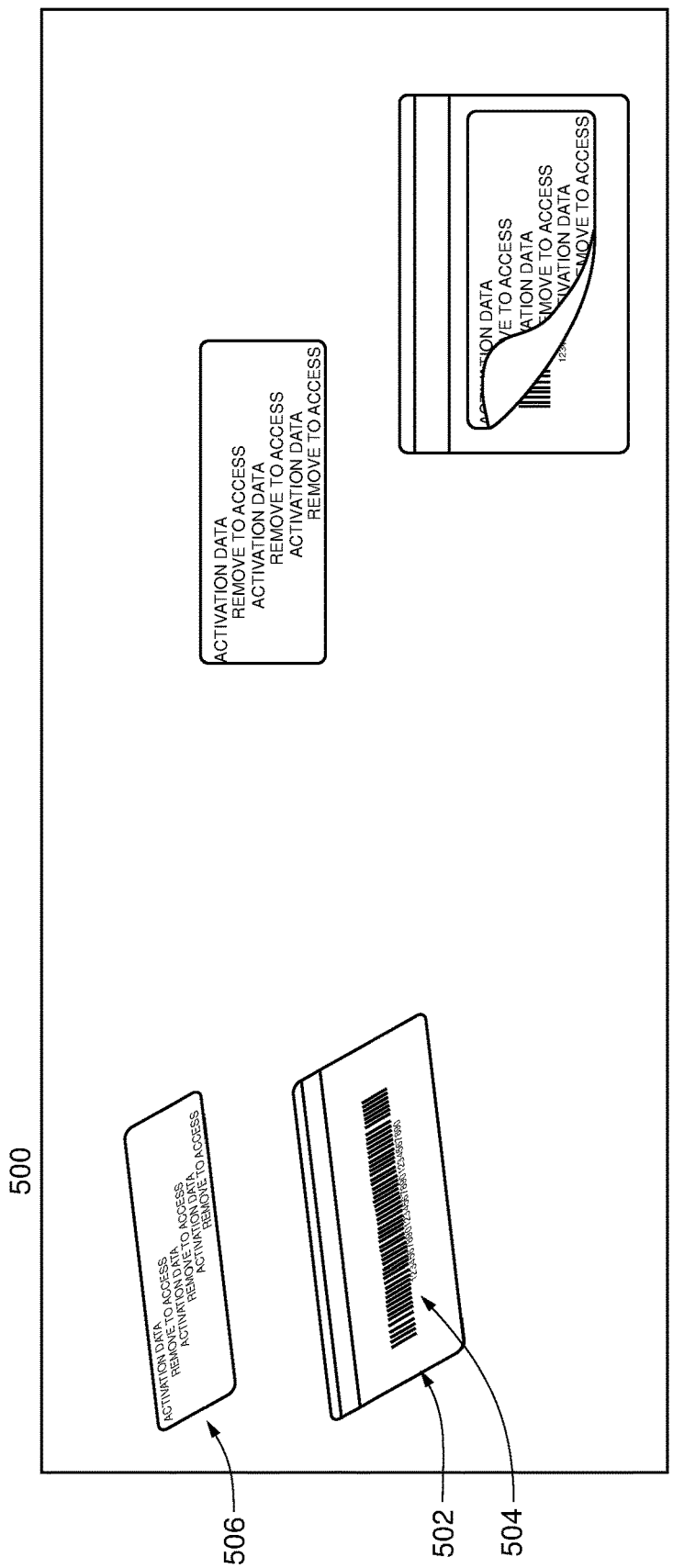
FIG. 5 depicts a stored-value card with tamper evident system including a self-destructing label according to an embodiment.

Referring to FIG. 5, a tamper evident system 500 generally includes an inactive or active stored value card 502 having a first activation indicia 504, such as a barcode, printed or otherwise applied there on. A destructible label 506 is adhered over the activation indicia 504. The label 506 can include text or graphics, for example, that irreversibly distorts or stretches upon removal of the label 506 such that if reapplied, tampering is evident. Label 506 is applied to card 502 with an adhesive providing a sufficient bond to cause the distortion upon removal. Additional embodiments are described in U.S. patent application Ser. No. 15/439,743 entitled "Stored Value Card and Carrier System with Tamper Evident Label," and incorporated herein by reference in its entirety.

Figure 6:
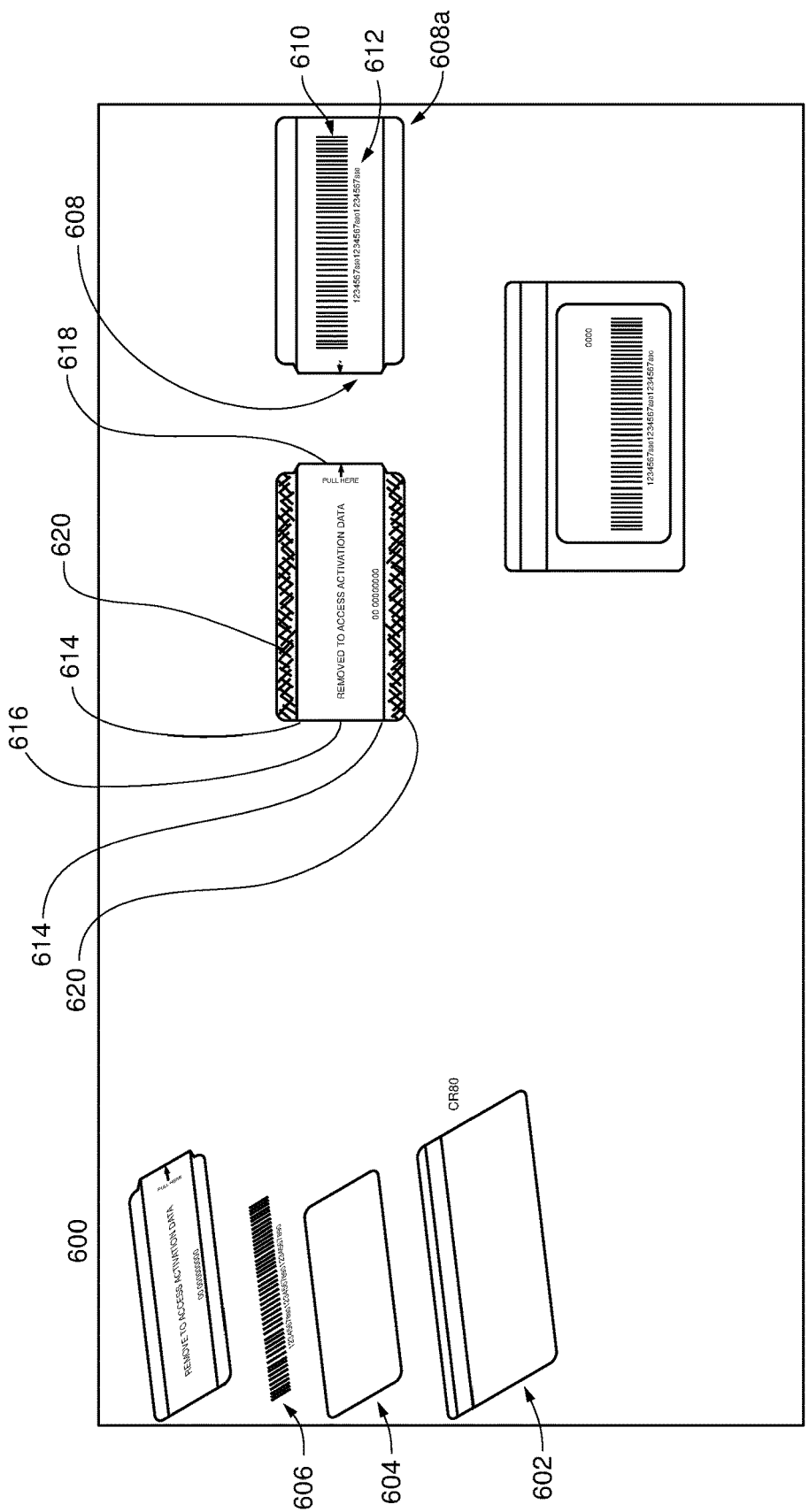
FIG. 6 depicts a stored-value card with two step activation system including a base label and removable pull tab label with tamper evident perforations according to an embodiment.

Referring to FIG. 6, in another embodiment, a stored value card with a two-step, tamper evident activation system 600 generally includes an inactive or active stored value card 602 having an opaque base label 604 permanently adhered to the card 602, a first activation indicia 606, such as a barcode and/or PIN, printed or otherwise applied to the base label 604, and a removable pull tab label 608 applied over and at least partially covering the first activation indicia 606. A second activation indicia 610 and optional serial number 612 are printed or otherwise applied on a reverse side 608*a* of the label 608 such that when the label 608 is adhered to the card 602, the second activation indicia 610 is not visible. The label 608 includes cut scores or perforations 614 forming a pull tab portion 616 including a pull tab 618, such that when the pull tab 618 is pulled back, the label 608 breaks at the cut scores or perforations 614 and only the pull tab portion 616 of the label is removed, revealing the first activation indicia 606 on the card 602, and the second activation indicia 610 on the reverse side 608*a* of the label 608. To activate the card 602, both the first and second activation indicia 606, 610 are read as described above.

The removable label 608 includes patterned cut scores or perforations 620 around the periphery such that in the event the entire label 608 is removed or attempted to be removed, the patterned cut scores or perforations 620 are irreversible broken or burst, indicating that the card 602 may be compromised, and activation is not recommended. In addition or alternatively, tamper evident text (not shown) may be included on the periphery of the removable label 608 such that if the removable label 608 is removed, the tamper evident text remains on the card 602 to indicate tampering, as described with respect to FIG. 1. In the event the base label 604 is entirely removed, there is no access to the card data or means for activation.

Figure 7:
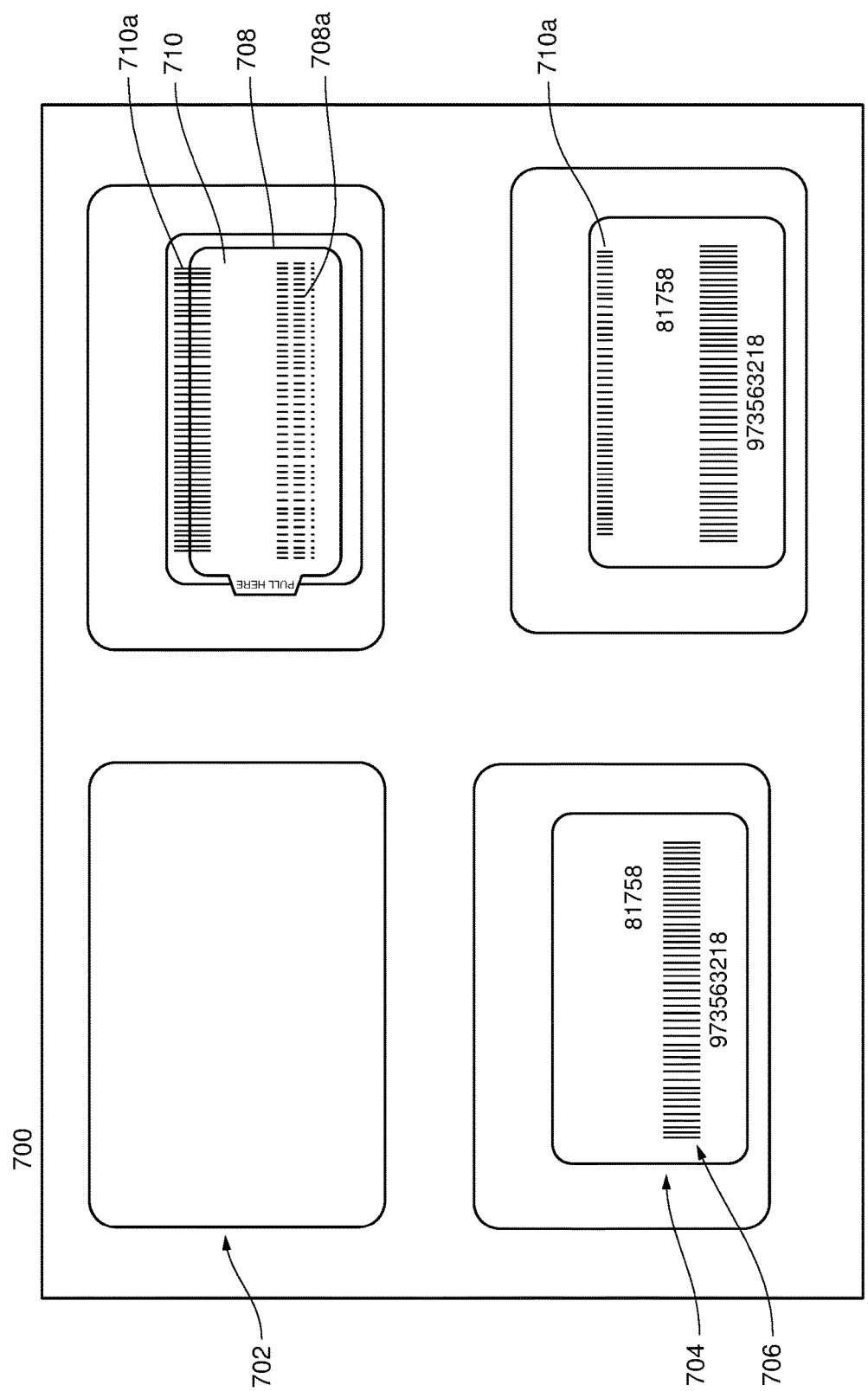
FIG. 7 depicts a stored-value card with two step activation system including a base label and removable pull tab label with overlapping activation indicia according to an embodiment.

In a similar embodiment, and referring to FIG. 7, a stored value card with a two-step, tamper evident activation system 700 generally includes an inactive or active stored value card 702 having an opaque base label 704 permanently adhered to the card 702, a first activation indicia 706, such as a barcode, account number, and/or serial number, printed or otherwise applied to the base label 704, and a removable pull tab label 708 applied over and at least partially covering the first activation indicia 706. A second activation indicia 710 and optional serial number (not shown) are printed or otherwise applied on a top side 708*a* of the label 708 such that a portion 710*a* of the second activation indicia 710 extends onto the base label 704 and/or card 702. To activate the card 702, the second activation indicia 710 is scanned as described above. The label 708 can optionally include cut scores or perforations 714 forming a pull tab portion 716 including a pull tab 718. The pull tab portion 716 of the removable label 708 is then pulled back to expose the first activation indicia 706, while rendering the second activation indicia 710 unable to be reapplied and aligned. The first activation indicia 706 is then scanned or read as described above to complete activation. Removal of the removable label 708 prior to activation makes replacement of the removable label 708 difficult to align with indicia 710*a* on label 704. Furthermore, in the event the base label 704 is entirely removed, there is no access to the card data or means for activation.

Figure 8:
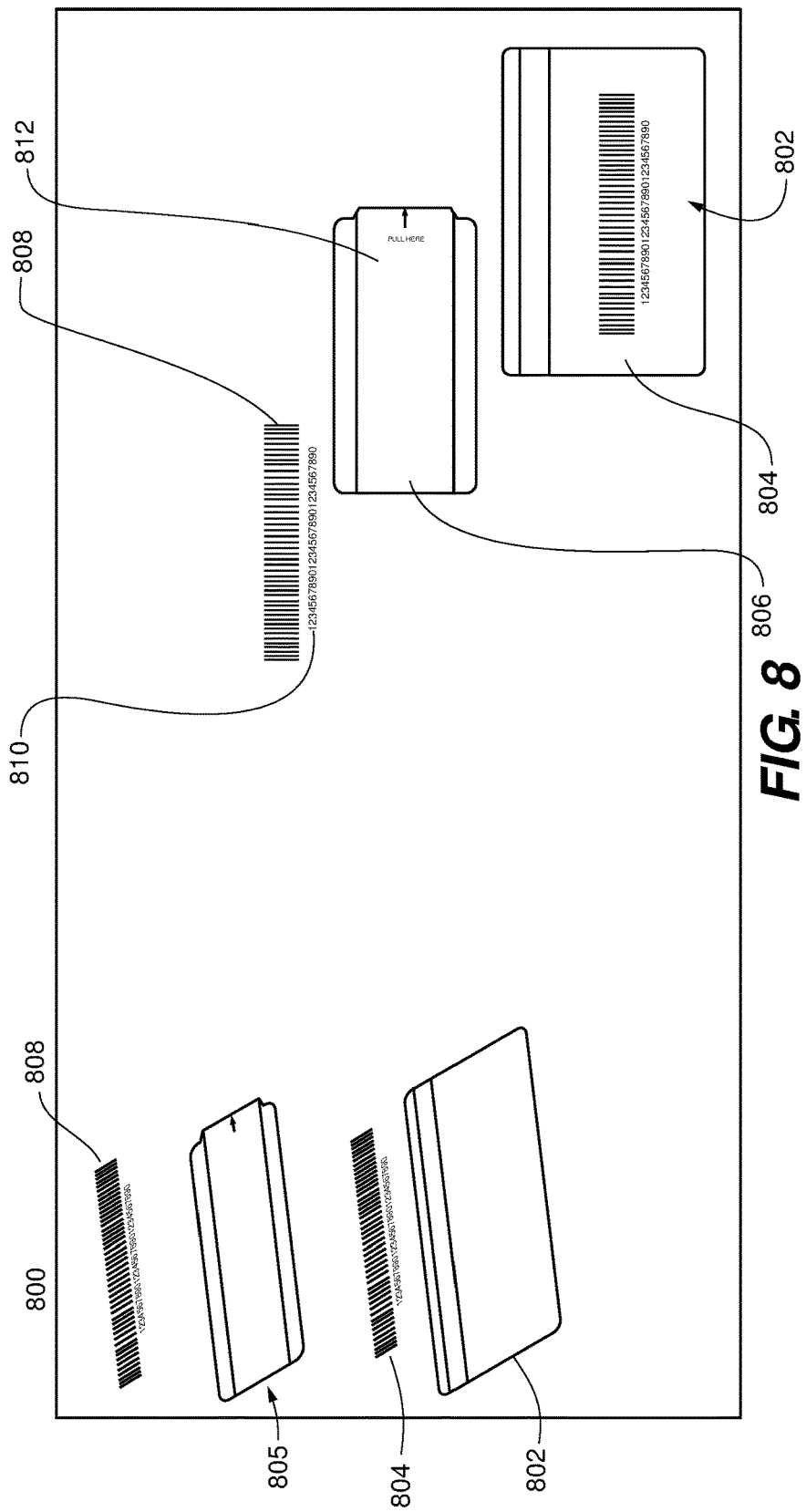
FIG. 8 depicts a stored-value card with two step activation system including a removable pull tab label with invisible activation indicia according to an embodiment.

Referring to FIG. 8, in yet another embodiment, a stored value card with two-step activation system 800 generally includes an inactive or active stored value card 802, a first activation indicia 804, such as a barcode, account number, and/or serial number, printed or otherwise applied to the card 802 and/or on an optional opaque label 805 permanently adhered to the card, and a removable pull tab label 806 applied over and at least partially covering the first activation indicia 804. A second activation indicia 808 and optional alphanumeric code 810 formed of an invisible fluorescent material or ink are printed or otherwise applied on the removable label 806 or reverse side (not shown) of the removable label 806. To activate, the second activation indicia 808 is scanned or otherwise read as described above. A pull tab portion 812 of the removable label 808 is pulled open to expose the first activation indicia 804 which is then scanned or otherwise read to complete activation. The invisible fluorescent second activation indicia 808 is difficult to copy or reproduce, as it may not be apparent to a thief that it exists. Furthermore, the pull tab removable label 806 indicates evidence of tampering if attempted to be removed to expose the first activation indicia 804.

Figure 9:
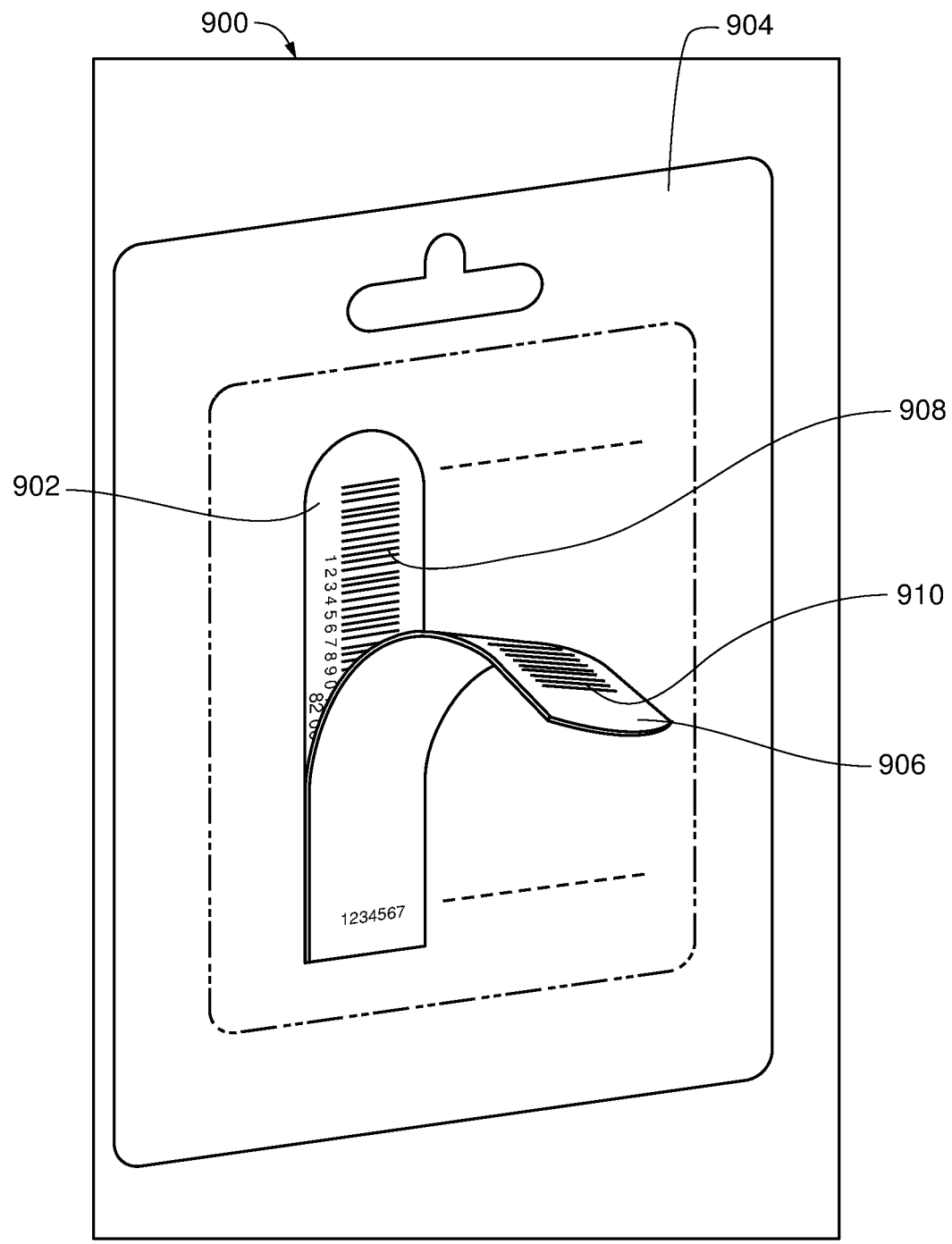
FIG. 9 depicts a stored-value card and packaging system with two step activation system including a first activation indicia coupled to the card, and a second activation indicia on a pull tab of the card carrier.

Referring to FIG. 9, a stored value card and packaging system 900 includes an inactive stored value card 902 and a card carrier 904, stored value card 902 being partially or completely enclosed within card carrier 904. Card carrier 904 includes structure defining a pull tab 906. Card 902 includes a first activation indicia 908, such as a barcode, account number, and/or serial number, thereon, and an optionally a label (not shown) with an optional serial number and/or other text and graphics printed thereon. Pull tab 906 includes second activation indicia 910 coupled to an inner facing surface of pull tab 906 such that it is secured within carrier 904. Upon purchase, pull tab 906 is pull back to reveal first and second activation indicia 908, 910 for activation. Alternatively, second activation indicia 910 is coupled to an exterior surface of pull tab 906. Upon purchase, second activation indicia 910 is scanned, and then pull tab 906 is pulled back to reveal first activation indicia 908 for scanning and completing activation. Pull tab 906 or other portions of carrier 904 can include burst patterns to provide visual indication of tampering. In either embodiment, first and/or second activation indicia 908, 910 can be formed of an invisible ink.

Alternatively, some stored value cards are pack activated, meaning first and second activation indicia (or more) is printed on the carrier, and the card is enclosed in the carrier. Any of the embodiments described above can be applied to the carrier or pack as activation indicia instead of it being applied to the card.

In general, and referring to the embodiments above, stored value cards are forms of transaction instruments associated with transaction accounts, in which the stored value cards provide cash equivalent value that may be used within an existing payment/transaction infrastructure. Stored value cards are frequently referred to as gift, pre-paid or cash cards, in that money is deposited in an account associated with the card before use of the cards is allowed. In general, such an account may be used for transactions between a user and a merchant through any suitable communication means, such as, for example, a telephone network, intranet, the global, public Internet, a point of interaction device, online communications, off-line communications, wireless communications, and the like. They may also be used in person at any point of sale (automated or not) that accepts them. The type of stored value card may be a gift card, loyalty card, credit or debit card, health or insurance card, phone card, pre-paid phone card, membership card, identification card, ring tone card, or any other type of card. The stored value card may be any such transaction instrument associated with any such transaction account.

The stored value card is typically the size and shape of a conventional credit card (i.e., CR80), although other sizes and shapes are possible, such as, for example, embodiments depicted and described in U.S. Patent Application Publication No. 2016/0031624, entitled "Tamper Evident Secure Pack with Anchored Card Carrier" and incorporated herein by reference in its entirety. The stored value card is commonly made of plastic, wood, bamboo, or paper, however other materials, such as other synthetic or natural materials are also contemplated.

The stored value card includes an account identifying element, such as a magnetic stripe, radiofrequency identification (RFID), bar code, QR code, text (recognized by Optical Character Recognition (OCR)), smart chip, for example. The account identifying element is encoded with data, which includes a unique account number. If the stored value card includes a magnetic stripe, that magnetic stripe may comprise a plastic film including tiny magnetic particles that can be magnetized in certain directions to record data on the card, which may be read by a card reader. If the stored value card includes a bar code or QR code, the bar code may comprise machine-readable data, which may be alpha-numeric. Bar code data includes black and white lines arranged to represent a series of numbers (e.g., a bar code comprising a Universal Product Code (UPC) has twelve digits) to a bar code scanner (printed account identifying elements). Other current or future developed account identifying elements are also possible. Also, more than one account identifying element may be included on the stored value card, and in any location.

The stored value card may include embossed or non-embossed features. An account identifying element(s) on the stored value card may be embossed (including at least one raised portion (e.g., letters, designs), or protuberance, etc.), or non-embossed.

The stored value card can be secured to or within a carrier such that account identifying elements or information (e.g. card or account identification number, PIN, etc.) is adjacent to the carrier, such that the account identifying elements or information are/is not able to be viewed, and only the activation data that is associated with the card or correlated to the account identifying elements is accessible, while the card is attached to the carrier.

As mentioned above, the stored value card can be made of plastic, paper, wood, bamboo, and other materials. The cards can be made of various types of plastic such as, but not limited to polyester, polypropylene, polyethylene, polycarbonate, polyvinyl acetate, PETG, APET, plastic laminated paper, or combinations thereof. The plastics can be of any size and thickness, including a preferred thickness of 30 mils, but may also be 24 to 34 mils thick. The pull tabs and/or labels referenced herein may be made of plastics such as polypropylene, polyester, APET, plastic laminated papers, paper, or combinations thereof. The labels can optionally include metalized materials such as silver, metallic foil, or a metallized hologram for added opacity and/or tamper evidence. The pull tab/label thickness can be in the range of 0.5 mil to 20 mil, or more particularly 1 mil to 10 mil. Adhesives used to adhere labels to the cards can include acrylic adhesive and/or solvent based adhesives known to those of ordinary skill in the art.

The barcodes/activation indicia may be created by printing inks, toners, or other materials onto the stored value cards and/or labels/pull tabs by means of ink jet, drop on demand, flexography, lithography, thermal printing, or any of a variety of printing methodologies known to one of ordinary skill in the art. The activation indicia can be printed in advance or inline during production such as printing after the label has been applied to the card. The label and card can include serial numbers such that the label indicia can be matched to the card during various manufacturing steps. For example, the reading of data, such as account numbers, indicia, PIN, serial numbers, and the like on the various pieces of the card and/or packaging allows matching and/or associating taking place through look-up tables contained within the printing systems during manufacturing and assembly.

Various tamper evident labels and carrier systems are also described U.S. patent application Ser. No. 15/439,743 entitled "Stored Value Card and Carrier System with Tamper Evident Label", and Ser. No. 15/585,953 entitled "Stored Value Card and Carrier Assembly with Tamper Evident Label", both of which are incorporated herein by reference in its entirety, and can be combined with any of the embodiments described herein.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

What is claimed is:

1. A stored value card activation system comprising:
   a stored value card;
   a first activation indicia applied directly or indirectly to the card;
   a removable label applied on the first activation indicia; and
   at least a portion of a second activation indicia applied to the removable label,
   wherein the card is activated upon reading both the first activation and the second activation indicia, and
   wherein the removable label is configured to be removed rendering the second activation indicia unreadable and/or to provide visual evidence of tampering.

2. The stored value card activation system of claim 1, wherein the at least a portion of the second activation indicia is applied to a card-facing surface of the removable label.

3. The stored value card activation system of claim 1, wherein the removable label includes a first portion with the second activation indicia thereon, and a second portion along an edge of the first portion and separated from the first portion by a score line.

4. The stored value card activation system of claim 3, wherein the second portion of the removable label further comprises tamper evident indicia on the card-facing surface, the tamper evident indicia being configured to be transferred to the stored value card upon removal of the second portion of the removable label from the card, thereby visually indicating tampering.

5. The stored value card activation system of claim 3, wherein the second portion of the removable label includes structure defining patterned cut scores configured to rupture when the second portion is removed from the card.

6. The stored value card activation system of claim 1, wherein the removable label includes a center portion, and at least one edge portion separable from the center portion, wherein the second activation indicia extends over the center portion and the at least one edge portion, and wherein removal of the center portion renders the second activation indicia unreadable.

7. The stored value card activation system of claim 1, further comprising:
   a base label adhered to the card, the base label including at least a portion of the first activation indicia thereon
   wherein the removable label is adhered to the base label, wherein the removable label is configured to be separated from the base label while the base label remains adhered to the card.

8. The stored value card activation system of claim 7, wherein the second activation indicia is at least partially obscured by the removable label until removal thereof.

9. The stored value card activation system of claim 7, wherein the base label includes structure defining patterned cut scores configured to rupture when the base label is removed from the card.

10. The stored value card activation system of claim 7, wherein the stored value card includes a portion of the first activation indicia and a portion of the second activation indicia applied directly thereon, such that removal of the removable label renders the second activation indicia unreadable, and removal of the base label renders the first activation indicia unreadable.

11. A stored value card activation system of claim 7, wherein the removable label includes a first portion of a second activation indicia applied thereon, wherein the removable label obscures the first activation indicia,
   wherein the base label includes a second portion of the second activation indicia such that when the removable label is coupled thereto, the second activation is readable,
   and
   wherein the removal of the removable label renders the second activation indicia unreadable.

12. The stored value card activation system of claim 1, wherein the second activation indicia is on an outer facing surface of the removable label, and wherein the second activation indicia is formed from an invisible ink.

13. A stored value card activation and packaging system comprising:
   a card carrier, the card carrier including structure defining a pull tab;
   a stored value card at least partially enclosed within the card carrier;
   a first activation indicia applied directly or indirectly to the card;
   a second activation indicia applied directly or indirectly to the pull tab;
   wherein the card is activated upon reading both the first activation and the second activation indicia, and
   wherein the pull tab provides visual evidence of tampering when pulled open to access the stored value card.

14. The stored value card activation and packaging system of claim 13, wherein the second activation indicia is coupled to an inner facing surface of the pull tab.

15. The stored value card activation and packaging system of claim 13, wherein the second activation indicia is coupled to an exterior facing surface of the pull tab.

16. The stored value card activation and packaging system of claim 13, wherein the first activation indicia is aligned with the pull tab such that the first activation indicia is readable without removing the card from the card carrier.

17. The stored value card activation and packaging system of claim 13, further comprising:
   a base label secured to the stored value card, at least a portion of the first activation indicia being applied to the base label.

18. The stored value card activation and packaging system of claim 17, wherein the first activation indicia is unreadable when the base label is removed from the card.

19. The stored value card activation and packaging system of claim 13, wherein at least one of the first and second activation indicia is formed of invisible ink.

20. The stored value card activation and packaging system of claim 15, wherein a portion of the second activation indicia extends beyond the pull tab and onto the carrier such that opening the pull tab renders the second activation indicia unreadable.

21. A stored value card activation system comprising:
a stored value card in a sealed carrier;
a first activation indicia applied directly or indirectly to the carrier;
a removable label applied on the first activation indicia; and
at least a portion of a second activation indicia applied to the removable label,
wherein the card is activated upon reading both the first activation and the second activation indicia, and
wherein the removable label is configured to be removed rendering the second activation indicia unreadable and/or to provide visual evidence of tampering.

22. The stored value card activation system of claim 21, wherein the second activation indicia is applied to a carrier-facing surface of the removable label.

23. The stored value card activation system of claim 21, wherein the removable label includes a first portion with the second activation indicia thereon, and a second portion along an edge of the first portion and separated from the first portion by a score line.

24. The stored value card activation system of claim 23, wherein the second portion of the removable label further comprises tamper evident indicia on the carrier-facing surface, the tamper evident indicia being configured to be transferred to the carrier upon removal of the second portion of the removable label from the card, thereby visually indicating tampering.

25. The stored value card activation system of claim 23, wherein the second portion of the removable label includes structure defining patterned cut scores configured to rupture when the second portion is removed from the carrier.

26. The stored value card activation system of claim 21, wherein the removable label includes a center portion, and at least one edge portion separable from the center portion, wherein the second activation indicia extends over the center portion and the at least one edge portion, and wherein removal of the center portion renders the second activation indicia unreadable.

27. The stored value card activation system of claim 21, further comprising:
a base label adhered to the carrier, the base label including at least a portion of the first activation indicia thereon;
wherein the removable label is configured to be separated from the base label while the base label remains adhered to the carrier.

28. The stored value card activation system of claim 27, wherein the second activation indicia is at least partially obscured by the removable label until removal thereof.

29. The stored value card activation system of claim 27, wherein the base label includes structure defining patterned cut scores configured to rupture when the base label is removed from the carrier.

30. The stored value card activation system of claim 27, wherein the stored value card carrier includes a portion of the first activation indicia, and a portion of the second activation indicia, such that removal of the removable label renders the second activation indicia unreadable, and removal of the base label renders the first activation indicia unreadable.

31. The stored value card activation system of claim 27, wherein the removable label includes a first portion of the second activation indicia applied thereon, wherein the removable label obscures the first activation indicia,
wherein the base label includes a second portion of the second activation indicia such that when the removable label is coupled thereto, the second activation is readable,
and
wherein the removal of the removable label renders the second activation indicia unreadable.

32. The stored value card activation system of claim 21, wherein the second activation indicia is on an outer facing surface of the removable label, and wherein the second activation indicia is formed from an invisible ink.

\* \* \* \* \*